3,479,362
SULFOALKYLATION OF ENAMINES
John R. Norell, Bartlesville, Okla., assignor to Phillips
  Petroleum Company, a corporation of Delaware
No Drawing. Continuation-in-part of application Ser. No.
  513,113, Dec. 10, 1965. This application June 7, 1968,
  Ser. No. 735,525
        Int. Cl. C07d 29/34, 87/46, 27/04
U.S. Cl. 260—293.4                                4 Claims

ABSTRACT OF THE DISCLOSURE

Sulfoalkylated enamines are prepared by reacting under suitable reaction conditions an enamine with a sultone in the presence of a suitable solvent and recovering the sulfoalkylated enamine product from the reaction mixtures. The sulfoalkylated enamine has particular utility as a rust inhibitor additive for lubricating oils.

---

This application is a continuation-in-part of my copending application Ser. No. 513,113, filed Dec. 10, 1965 and now abandoned.

This invention relates to novel compounds and also to methods for producing them. In one aspect this invention relates to the preparation of sulfoalkylated derivatives of enamines. In another aspect this invention relates to novel sulfoalkylated enamine products.

The novel compounds of this invention may be employed as lubricant additives, as corrosion inhibitors, and as agricultural chemicals. In particular, the compounds of the invention have utility as a rust corrosion inhibitor additive for lubricating oils.

Therefore, it is an object of this invention to provide new sulfoalkylated derivatives of enamine products.

Another object of this invention is to provide a process for reacting the γ-sultone of 3-hydroxy-1-propanesulfonic acid with N-(1-cyclohexen-1-yl)piperidine.

These and other objects of the present invention are provided by reacting an enamine having the formula

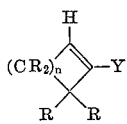

with a sultone characterized by the formula $$\underset{\underline{\hspace{2cm}O\hspace{2cm}}}{CR_2CR_2CR_2SO_2}$$

wherein R is at least one member selected from the group consisting of hydrogen and alkyl radicals having 1–3 carbon atoms; Y is a saturated secondary amino radical preferably having 2–12 carbon atoms; and $n$ is an integer from 1–7; and wherein the number of carbon atoms in said enamine preferably is within the range of 6–20, and the number of carbon atoms in said sultone is preferably within the range of 3–10. The products of this reaction are characterized by the following generic formula

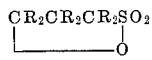      ; these sulfoalkylated enamines are internal ionic salts of the type generally designated as zwitter ions.

The sultones employed in the preparation of the present compounds can be prepared, e.g., by sulfochlorination of an organic halide, hydrolysis of the halogenated organic sulfonyl chloride thereby formed, and ring-closure of the hydrolysis product, with evolution of hydrogen halide, yielding the sultone.

Enamines suitable for use in the process of this invention are:

N,N-dimethyl-1-cyclobuten-1-ylamine
N,N-diethyl-1-cyclopenten-1-ylamine
N-methyl-n-ethyl-1-cyclohexen-1-ylamine
N-isopropyl-N-butyl-1-cyclohepten-1-ylamine
N,N-dihexyl-1-cycloocten-1-ylamine
N,N-dicyclopentyl-1-cyclononen-1-ylamine
N-methyl-N-cyclohexyl-1-cyclodecen-1-ylamine
N-ethyl-N-cyclopentylmethyl-1-cyclopenten-1-ylamine
N,3-dimethyl-N-(3-methylcyclopentyl)-1-cyclohexen-
  1-ylamine
N,N-dipropyl-4,4-diethyl-1-cyclohexene-1-ylamine
N,N,3-trimethyl-8-propyl-1-cycloocten-1-ylamine
N-(1-cyclohexen-1-yl)piperidine
N-(4,6-diethyl-1-cyclohepten-1-yl)pyrrolidine
N-(5-methyl-7-isopropyl-1-cycloocten-1-yl)morpholine
N-(1-cyclopenten-1-yl)-3-methylpiperidine
N-(1-cyclohepten-1-yl)hexamethylenimine Sultones suitable for use in the process of this invention are:

γ-sultone of 3-hydroxy-1-propanesulfonic acid
γ-sultone of 3-hydroxy-1-butanesulfonic acid
γ-sultone of 3-hydroxy-1-pentanesulfonic acid
γ-sultone of 3-hydroxy-1-hexanesulfonic acid
γ-sultone of 4-hydroxy-2-pentanesulfonic acid
γ-sultone of 2,2-dimethyl-3-hydroxy-1-propanesulfonic
  acid
γ-sultone of 3-hydroxy-4-methyl-1-pentanesulfonic acid
γ-sultone of 2,4-dimethyl-4-hydroxy-2-pentanesulfonic
  acid
γ-sultone of 5-hydroxy-3-heptanesulfonic acid
γ-sultone of 5-ethyl-6-hydroxy-4-octanesulfonic acid
γ-sultone of 3-ethyl-4-hydroxy-2-hexanesulfonic acid In preparing the sulfoalkylated enamines of the invention, it is preferred to operate substantially as follows: The enamine and sultone are preferably employed in a molar ratio of approximately 1:1. If desired, an excess of the more readily available component may be used in order to maximize utilization of the less readily available component and ratios of enamine to sultone in the range of 10:1 to 0.1 to 1 can be employed. Unreacted sultone or enamine may be readily removed at the end of the reaction, e.g. by extraction, distillation, etc. The temperature at which this reaction takes place will depend on the reactivity of the components; however the reaction can be carried out within the range of about 20–150° C., usually being within the range of about 50–100° C. The reaction time can vary over a wide range depending in part on the reaction temperature, but will generally be within the range of about 10 minutes to about 16 hours, usually being within the range of about 30 minutes to about 8 hours. Preferably a solvent such as an alcohol or ether is employed. Examples of some suitable solvents are methyl alcohol, ethyl alcohol, isopropyl alcohol, n-butyl alcohol, cyclohexanol, ethyl ether, n-butyl ether, monomethyl ether of ethylene glycol, dioxane, and the like. Mixing may be accomplished in any suitable manner. The total amounts of enamine and sultone may be mixed initially and then the necessary heat applied, or one of the reactants may be added gradually to the other.

The reaction pressure need be only sufficient to maintain the reaction mixture substantially in the liquid phase. The sulfoalkylated enamine product is conveniently isolated from the reaction mixture by conventional techniques, e.g. by removal of solvent and crystallization of the product.

The products of this reaction are usually somewhat water-soluble, stable salts. Examples of products which can be prepared by following the teaching of this disclosure are as follows:

N,N-dimethyl-2-(3-sulfopropyl)-1-cyclobuten-1-ylamine
N,N-diethyl-2-(1-methyl-3-sulfopropyl)-1-cyclopenten-1-ylamine
N-methyl-N-ethyl-2-(1-ethyl-3-sulfopropyl)-1-cyclohexen-1-ylamine
N-isopropyl-N-butyl-2-(1-propyl-3-sulfopropyl)-1-cyclohepten-1-ylamine
N,N-dihexyl-2-(1,2-diethyl-3-sulfohexyl)-1-cycloocten-1-ylamine
N,N-dicyclopentyl-2-(1-methyl-3-sulfobutyl)-1-cyclononen-1-ylamine
N-methyl-N-cyclohexyl-2-(2,2-dimethyl-3-sulfopropyl)-1-cyclodecen-1-ylamine
N-ethyl-N-cyclopentylmethyl-2-(1-isopropyl-3-sulfopropyl)-1-cyclopenten-1-ylamine
N,3-dimethyl-N-(3-methylcyclopentyl)-2-(1,1,3-trimethyl-3-sulfobutyl)-1-cyclohexen-1-ylamine
N,N-dipropyl-2-(1-ethyl-3-sulfopentyl)-4,4-diethyl-1-cyclohexen-1-ylamine
N,N,3-trimethyl-2-(1,2-diethyl-3-sulfobutyl)-8-propyl-1-cycloocten-1-ylamine
N-[2-(3-sulfopropyl)-1-cyclohexen-1-yl]piperidene
N-[2-(1-ethyl-3-sulfopropyl)-4,6-diethyl-1-cyclohepten-1-yl]pyrrolidine
N-[2-(1,2-diethyl-3-sulfohexyl)-5-methyl-7-isopropyl-1-cycloocten-1-yl]morpholine
N-[2-(1-methyl-3-sulfobutyl)-1-cyclopenten-1-yl]-3-methylpiperidine
N-[2-(1-ethyl-3-sulfopentyl)-1-cyclohepten-1-yl]hexamethylenimine
N-[2-(3-sulfopropyl)-1-cyclopenten-1-yl]pyrrolidine
N,N-dimethyl-2-(3-sulfopropyl)-1-cyclopenten-1-ylamine
N,N-diethyl-2-(3-sulfopropyl)-1-cyclohexen-1-ylamine
N,N-dimethyl-2-(3-sulfopropyl)-1-cycloocten-1-ylamine The invention is further illustrated but not limited by the following examples:

EXAMPLE I

N-(1-cyclohexen-1-yl)piperidine (B.P. 117° C./15 mm.) was prepared from cyclohexanone and piperidine in the presence of a trace of p-toluene-sulfonic acid in a benzene solvent by the method of Stork and co-workers, J. Am. Chem. Soc., 85, 207 (1963).

A mixture of 12.1 g. (0.10 mol) of the freshly distilled γ-sultone (B.P. 95° C./0.2 mm.) of 3-hydroxy-1-propanesulfonic acid, 17.1 g. (0.10 mol) of N-(1-cyclohexen-1-yl) piperidine, and 50 ml. of absolute ethyl alcohol was heated at reflux under a nitrogen atmosphere for 6 hours. After removal of the ethyl alcohol under reduced pressure, ether was added to the yellow viscous oil, giving a slurry. The slurry was filtered to give 17.9 g. of a white powder, representing a 63 mol percent yield of N-[2-(3-sulfopropyl)-1-cyclohexen-1-yl]piperidine ($C_{14}H_{25}NO_3S$), present as the inner salt (zwitter ion). This product was recrystallized from a benzene-ethanol solution, giving a white powder which decomposed at 249–251° C. to a red oil. The infrared spectrum of the recrystallized product exhibited a strong band at 2.8 microns indicative of the

group, a band at 6.0 microns indicative of the

linkage, and a band between 8.0 and 9.0 microns characteristic of the —$SO_3^-$ group.

*Analysis.*—Calcd. for $C_{14}H_{25}NO_3S$: C, 58.6; H, 8.7; N, 4.9; S, 11.1. Found: C, 58.48; H, 8.90; N, 5.0; S, 11.28.

EXAMPLE II

The powdered N-[2-(3-sulfopropyl)-1-cyclohexen-1-yl] piperidine prepared in Example I was added to an SAE 30 grade base oil, the sulfoalkylated enamine being added in an amount equal to 1 percent by weight of the base oil. The base oil-additive composition was then subjected to the Sohio Rust Test, a modification of the ASTM D665–IP135 test, the modification being that the test specimen was immersed in a 1 percent acetic acid solution instead of distilled water, and the test was for a period of 16 hours rather than 24 hours. A control run was made using the same base oil alone, and the two runs were performed simultaneously under the same laboratory conditions.

The test results are summarized below:

|  | Rust color ratings (10=rust free) |
|---|---|
| Base oil alone | 5.6 |
| Base oil+1 percent by weight of N-[2-(3-sulfopropyl)-1-cyclohexen-1-yl]piperidine | 6.3 |

The above test demonstrates that the compounds of the invention act as a rust corrosion inhibitor additive in lubricating oils. Generally, the amount of the sulfoalkylated enamine added to the lubricating oil stock will be in the range of from .05–5 percent, preferably .5–3 percent, by weight. The exact amount of the sulfoalkylated enamine employed within the above-mentioned ranges will depend upon the specific characteristics of the base oil stock, the presence or absence of other additive materials, etc.

Obviously many modifications and variations of the present invention are possible in the light of the above teachings. It is therefore to be understood that within the scope of the appended claims that the invention may be practiced otherwise than as specifically described herein.

What is claimed is:

1. A process for preparing a sulfoalkylated enamine having the formula

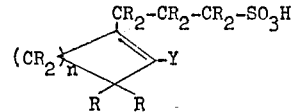

which comprises the steps of reacting an enamine having 6–20 carbon atoms and having the formula

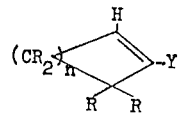

with a sultone having 3–10 carbon atoms and having the formula

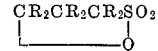

in the presence of a solvent selected from the group consisting of low molecular weight alcohols and ethers, said reaction taking place within a temperature ranging from 20 to 150° C. and at a pressure sufficient to maintain the reaction mixture substantially in the liquid phase and recovering the sulfoalkylated enamine product from said reaction mixture, wherein R may be the same or different and is selected from the group consisting of hydrogen and alkyl radicals having 1–3 carbon atoms; $n$- is an integer from 1–7; and Y is selected from the group consisting of N,N-dialkylamino wherein the alkyl radicals contain 1–6 carbon atoms, N,N-dicyclopentylamino, N-methyl-N-cyclohexylamino, N-ethyl-N-cyclopentylmethylamino, N-methyl-N-(methylcyclopentyl)amino, piperidino, methylpiperidino, pyrrolidino, morpholino, and hexamethyleneimino.

2. A process according to claim 1 wherein N-[2-(3-sulfopropyl)-1-cyclohexen-1-yl]piperidine is prepared by reacting the γ-sultone of 3-hydroxy-1-propanesulfonic acid with N-(1-cyclohexen-1-yl)piperidine in the presence of ethyl alcohol at a temperature of about 80° C.

3. A sulfoalkylated enamine having the formula

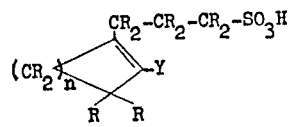

wherein R may be the same or different and is selected from the group consisting of hydrogen and alkyl radicals having 1-3 carbon atoms; *n* is an integer from 1-7; and Y is selected from the group consisting of N,N-dialkylamino wherein the alkyl radicals contain 1-6 carbon atoms, N,N-dicyclopentylamino, N-methyl-N-cyclohexylamino, N-ethyl-N-cyclopentylmethylamino, N-methyl-N-(methylcyclopentyl)amino, piperidino, methylpiperidino, pyrrolidino, morpholino, and hexamethyleneimino.

4. A product as defined in claim 3, N-[2-(3-sulfopropyl)-1-cyclohexen-1-yl]piperidine.

References Cited

UNITED STATES PATENTS 3,350,390 10/1967 Huenig et al.
3,367,864 2/1968 Elliott et al. _____ 260—503

OTHER REFERENCES

Advances in Organic Chemistry: Methods & Results, vol. 4, Raphael et al. eds., 1963, pp. 68–69 by Szmuszkovicz, Interscience Publishers.

HENRY R. JILES, Primary Examiner

S. D. WINTERS, Assistant Examiner

U.S. Cl. X.R.

252— 47.5; 260—239, 347, 247.1, 293, 293.47, 326.8, 326.81, 326.82, 327, 503, 563